United States Patent [19]
Lee

[11] Patent Number: 5,928,359
[45] Date of Patent: Jul. 27, 1999

[54] DEVICE AND METHOD FOR SELECTIVELY RESETTING COMPONENT BLOCKS OF A SYSTEM

[75] Inventor: Kang Bok Lee, Kyungsangbuk-do, Rep. of Korea

[73] Assignee: LG Semicon Co., Ltd., Chungcheongbuk-do, Rep. of Korea

[21] Appl. No.: 08/866,237

[22] Filed: May 30, 1997

[30] Foreign Application Priority Data

Oct. 28, 1996 [KR] Rep. of Korea ............ 96-49054

[51] Int. Cl.⁶ ........................ G06F 1/24
[52] U.S. Cl. ............................ 713/1
[58] Field of Search ............ 395/651; 713/1

[56] References Cited

U.S. PATENT DOCUMENTS

| | | | |
|---|---|---|---|
| 5,086,505 | 2/1992 | Goldberg et al. ............ | 395/651 |
| 5,155,856 | 10/1992 | Bock et al. ............ | 395/651 |
| 5,465,360 | 11/1995 | Miller et al. ............ | 395/651 |
| 5,758,185 | 5/1998 | Takano ............ | 395/651 |

OTHER PUBLICATIONS

Mitsubishi Co. Data Book: '94 Data Book, "Something New", p. 11, pp. 77–80.

*Primary Examiner*—Thomas M. Heckler

[57] ABSTRACT

A device and method for selectively resetting component blocks of a system having a microprocessor control unit, includes a reset signal mechanism for generating a reset signal to the system; and a driving mechanism for determining whether each of the component blocks is to be initialized or maintained in its present state upon receiving the reset signal, and selectively initializing the component blocks of the system based on the determination.

20 Claims, 6 Drawing Sheets

F I G.6 decision bit { 0: initialize in case of input of reset signal
1: keep present set value in case of input of reset signal

DEVICE AND METHOD FOR SELECTIVELY RESETTING COMPONENT BLOCKS OF A SYSTEM

BACKGROUND OF THE INVENTION

1. Field of the Invention

The present invention relates to setting a mode of an apparatus having a microprocessor control unit and, more particularly, to a reset device which selectively sets an operation mode of the component blocks of a system using a reset function, and a method of setting the driving mode using the reset device.

2. Discussion of Related Art

Generally, every apparatus including an MCU (microprocessor control unit) usually has a reset function. With the reset function, a part of the apparatus or the overall system is set to the initial state of the system established when the electric power is first supplied to the system. The reset function is necessary to restart the system when the system malfunctions due to noise and overheating.

Figure 1:
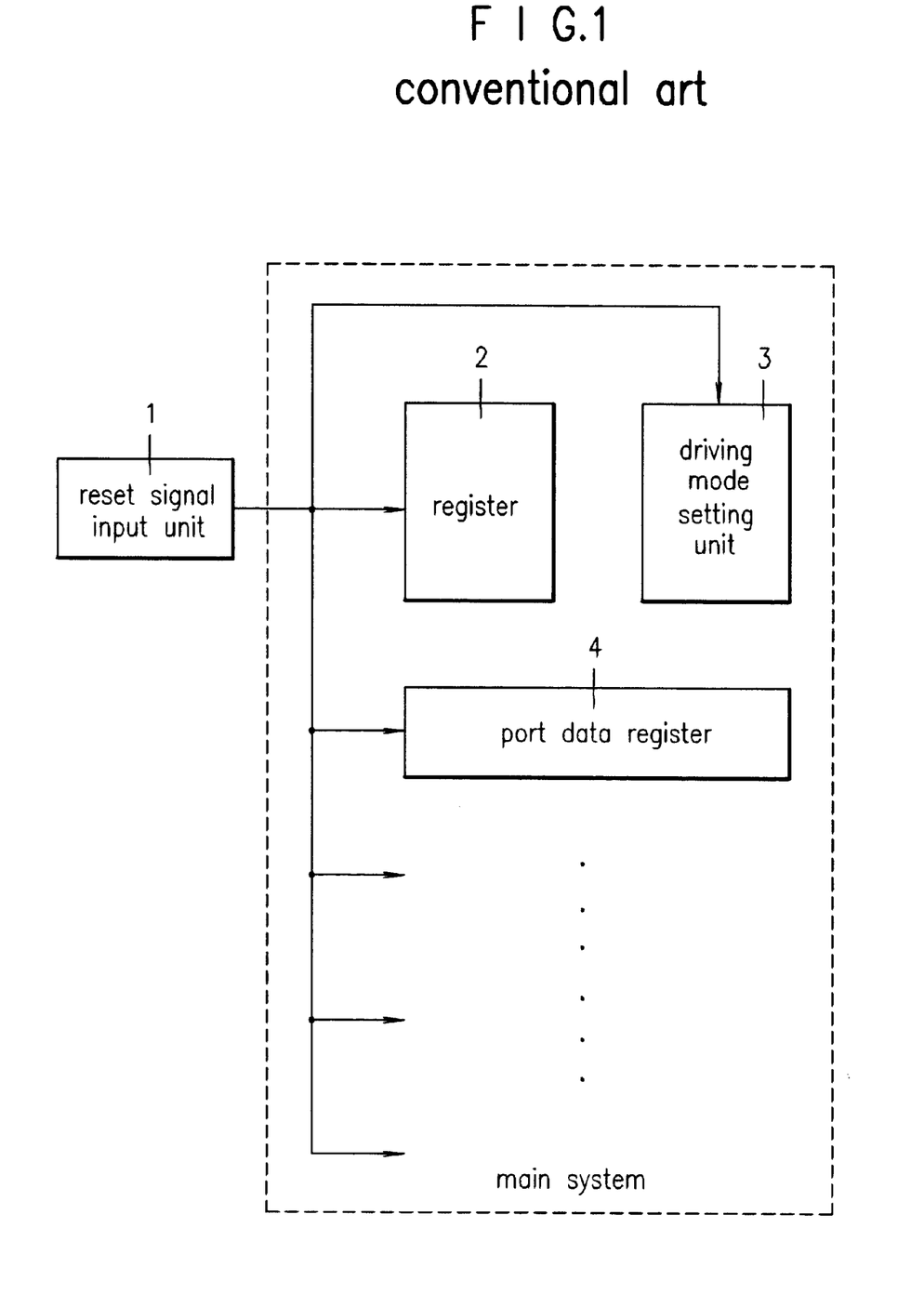
FIG. 1 is a block diagram of a conventional reset device.
Figure 2:
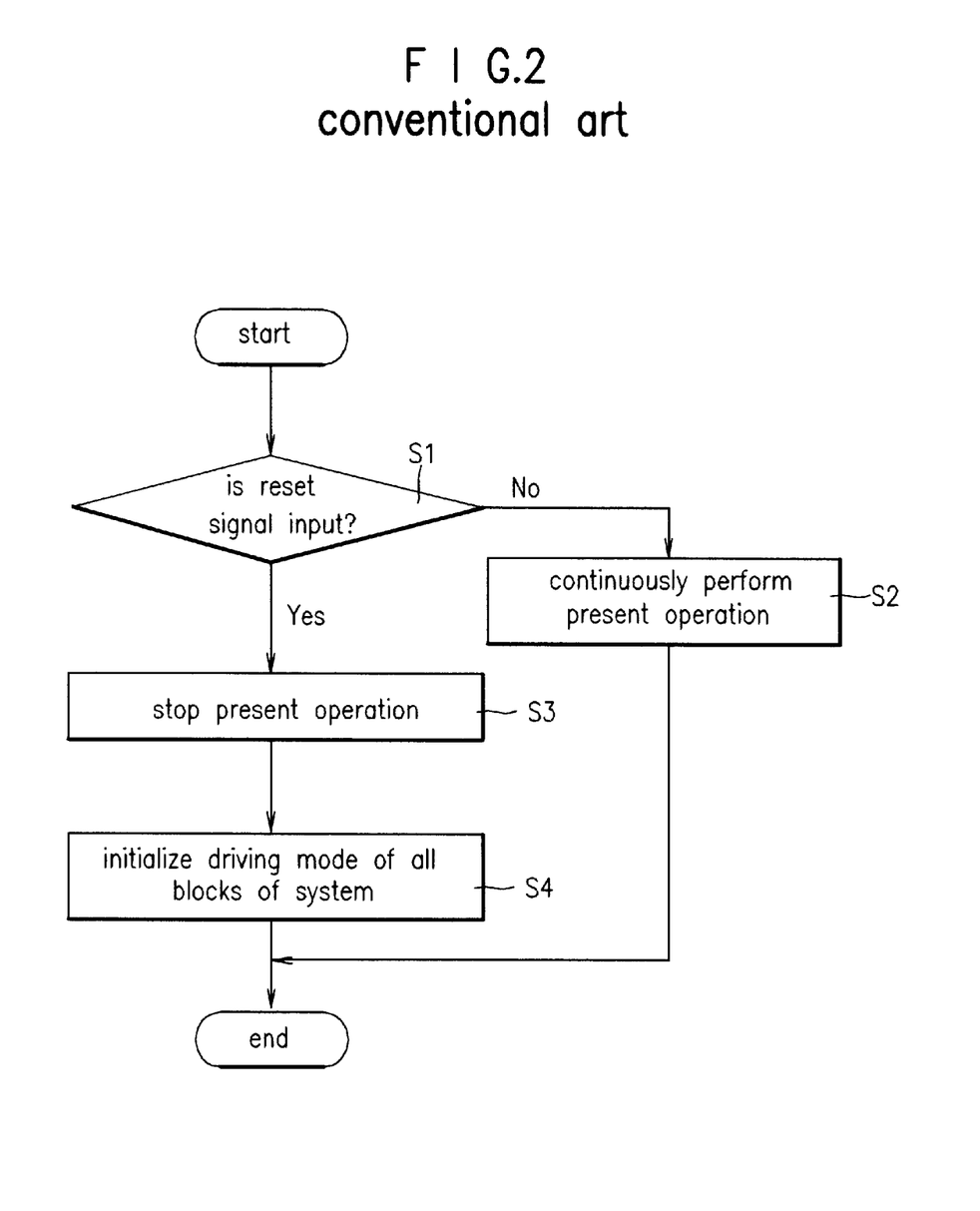
FIG. 2 is a flow chart for explaining a conventional reset operation by the conventional reset device.

FIG. 1 shows a block diagram of the structure of a conventional reset device. FIG. 2 shows a flow chart for illustrating a conventional reset operation of the conventional reset device.

As shown in FIG. 1, a reset signal input unit 1 inputs a reset signal to all component blocks for systematically initializing the driving mode of all the component blocks. The reset signal is most effective in simultaneously initialing all the component blocks. The component blocks include a register 2, a driving mode setting unit 3 and a port data register 4, and are driven normally or abnormally.

As shown in FIG. 2, if the reset signal from the reset signal input unit 1 is input to the system while any one of the component blocks is operating normally or abnormally (step S1), all the component blocks stop their operations (step S3). Then the driving mode of the overall system is initialized (step S4). If the reset signal is not input, each component block continues its present operation (step S2). In the initializing step (S4), a resetting function is performed as follows.

If the apparatus having the MCU operates in an abnormal manner, the reset signal is input to discontinue the abnormal operation of the apparatus and to initialize the apparatus immediately. The reset signal is generated according to the user's selection. If the apparatus is operating normally, the present operation is completed and then the apparatus returns to its initial state to perform other operations.

However, the above conventional reset operation automatically initializes the entire system without considering whether the operation of each component block prior to the reset signal is normal or abnormal. The reset signal initializes even the component blocks of the system which do not require resetting. Therefore, many component blocks of the system are unnecessarily reset to the initial state, which wastes power and operation time and results in a decreased efficiency.

SUMMARY OF THE INVENTION

Accordingly, the present invention is directed to a reset device and a driving mode setting method that substantially obviates one or more of the problems due to limitations and disadvantages of the related art.

An object of the present invention is to provide a reset device and a driving mode setting method for selectively determining whether each of the component blocks of a system need to be initialized based on the driving state of each component block prior to the reset signal, so that the user is not inconvenienced by the unnecessarily reset component blocks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, the reset device according to the embodiments of the present invention selectively performs a reset function to maintain a present set value of a component block or to perform an initialization according to a reset signal which is selectively input to each of the component blocks according to the external or internal data provided by an apparatus having an MCU.

The driving mode setting method using the reset device according to the embodiments of the present invention includes the steps of detecting a present state of each component block of a system when the reset signal is input, determining whether a pertinent component block need to be reset or maintained in its present driving mode, and setting the rest of the component blocks of the system based on the determination.

It is to be understood that both the foregoing general description and the following detailed description are exemplary and explanatory and are intended to provide further explanation of the invention as claimed.

Briefly described, the present invention is directed to a reset device for selectively resetting component blocks of a system having a microprocessor control unit, the device including reset signal means for generating a reset signal to the system; and driving means for determining whether each of the component blocks is to be initialized or maintained in its present state upon receiving the reset signal, and selectively initializing the component blocks of the system based on the determination.

Furthermore, the present invention is directed to a method of selectively resetting component blocks of a system having a microprocessor control unit, the method including the steps of generating a reset signal to the system; determining whether each of the component blocks is to be initialized or maintained in its present state, upon receiving the reset signal; and selectively initializing the component blocks of the system based on the determination.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention, wherein.

DETAILED DESCRIPTION OF PREFERRED EMBODIMENTS

Reference will now be made in detail to the preferred embodiments of the present invention, examples of which are illustrated in the accompanying drawings.

With reference to the attached drawings, the present invention is described below.

In the present invention, all of the component blocks of a system having an MCU are not initialized by an input of a system reset signal. Instead, a reset device is utilized to determine whether each component block needs to be initialized and to initialize the component blocks according to the determination. As a result, the component blocks which do not require initialization are maintained in their present states. The design of the reset device may depend on the way in which the information for making such determination is received.

Figure 3:
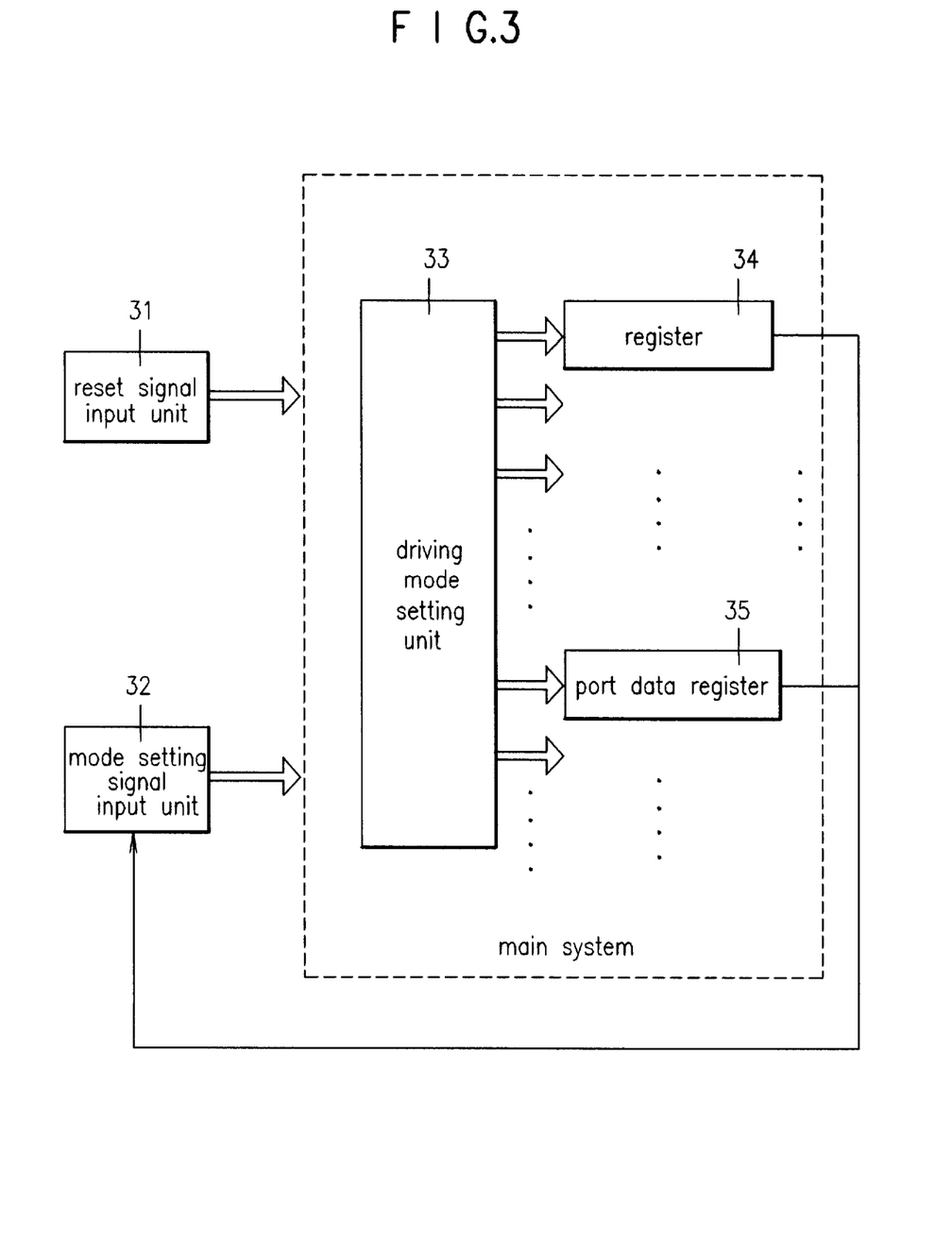
FIG. 3 is a block diagram of a reset device according to one embodiment of the present invention.

According to one embodiment of the present invention, the reset device as shown in FIG. 3 allows selective initializing of component blocks.

Referring to FIG. 3, in a system having an MCU, a reset signal input unit 31 inputs a reset signal according to a user's selection when the operation of the system is in an abnormal state. The reset signal may be generated by the reset input unit 31 or by an external source. The reset signal from the input unit 31 is input to a main system having a plurality of component blocks, such as, a register 34 and a port data register 35. When the reset signal is input, a mode setting signal input unit 32 detects the present setting of each component block in the main system and determines whether the present setting of each component block is to be maintained. Based on this determination, the mode setting signal input unit 32 inputs a mode setting signal to the main system.

A driving mode setting unit 33 selectively initializes the component blocks based on the reset signal and the mode setting signal. That is, the register 34, the port data register 35, and other component blocks are initialized or maintained in their present states according to signals output by the driving mode setting unit 33. The driving mode setting unit 33 can use circuits know in the art for selectively outputting the reset signal to the component blocks based on the mode setting signal, e.g., based on the level of the mode setting signal. The mode setting signal input unit 32 outputs the mode setting signal to initialize the relevant component blocks according to the logic state of pins corresponding to each component block, e.g., by comparing the logic states of the pins of each component block with prestored data using a comparator known in the art.

The operation of the reset device as shown in FIG. 3 according to the embodiments of the present invention is as follows.

Figure 4:
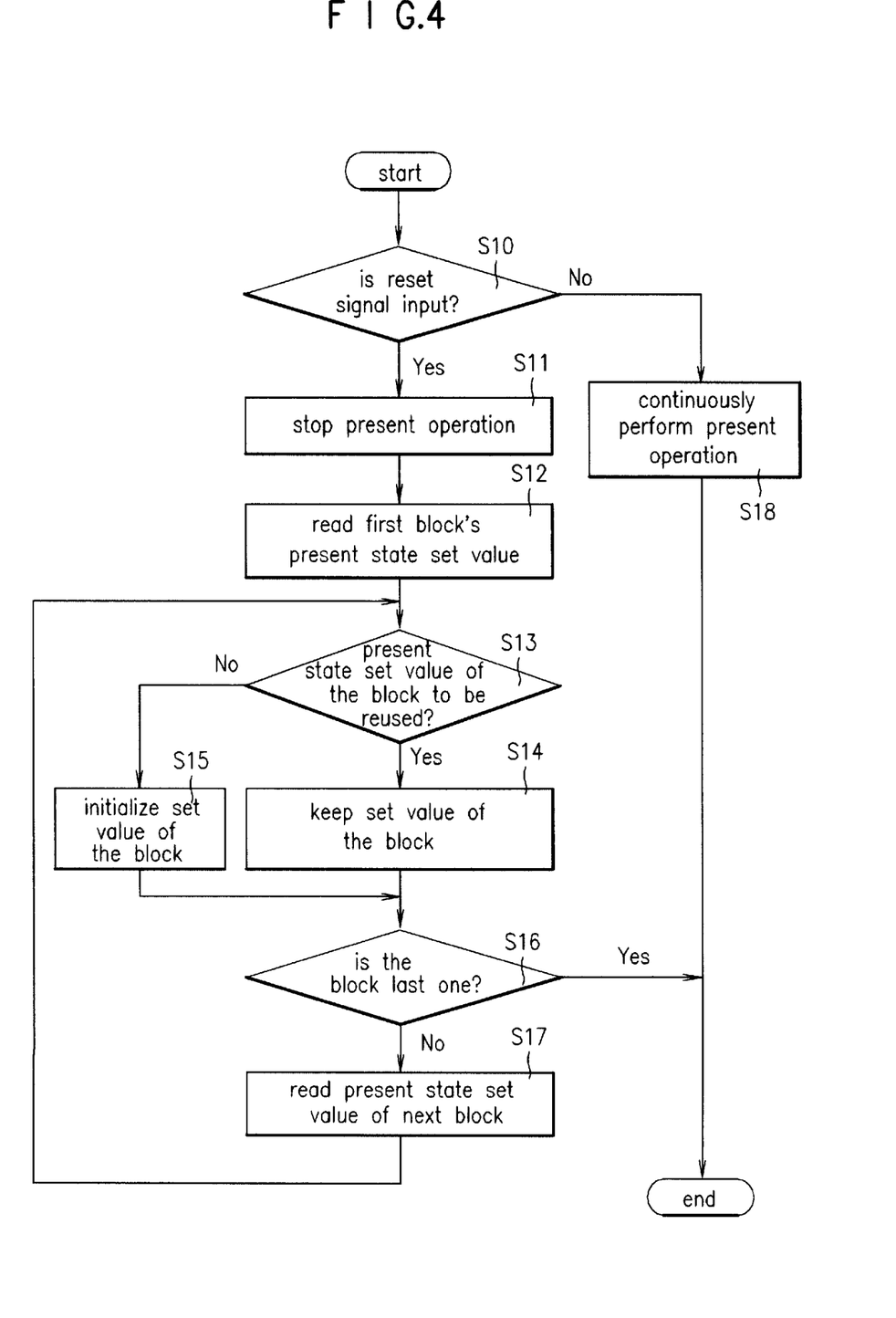
FIG. 4 is a flow chart for explaining a reset operation of the reset device according to the embodiments of the present invention.

As shown in FIG. 4, if the reset signal is input to the main system by the reset signal input unit 31 in step S10, the operation being performed by each component block of the main system is stopped in step S11. The set value of the first component block's present state is read in step S12. In step S13, it is determined whether the present state set value of the component block is to be reused according to the information given by the mode setting signal input unit 32. If the set value of the component block is not to be reused, the set value of the component block is initialized in step S15. If the set value is to be reused, the present state of the component block is maintained in step S14. After completing the steps S13 to S15, if the present component block is not the last component block in the system as determined in step S16, the set value of the next component block's present state is read in step S17. The steps S13 to S17 are repeated for all of the component blocks, so that only those component blocks which need to be initialized are reset. If the reset signal is not input, the present operations of the component blocks are continuously performed in step S18.

In the drive mode setting method according to the present invention, the component blocks which do not require initialization are unaffected by the reset signal. In maintaining the states of these component blocks, the present state set values are reused in a manner similar to a restart operation.

A reset device and a driving mode setting method according to another embodiment of the present invention are as follows.

The reset device according to this embodiment includes a register block for deciding whether the present state set value of each component block is to be reused. If there is an insufficient number of ports in the system, a separate register is used to determine the present state set value of each component block. Once the register block or separate register determines that the set value of the component block is to be reused, initialization of that component block does not occur even if the reset signal is received.

Figure 5:
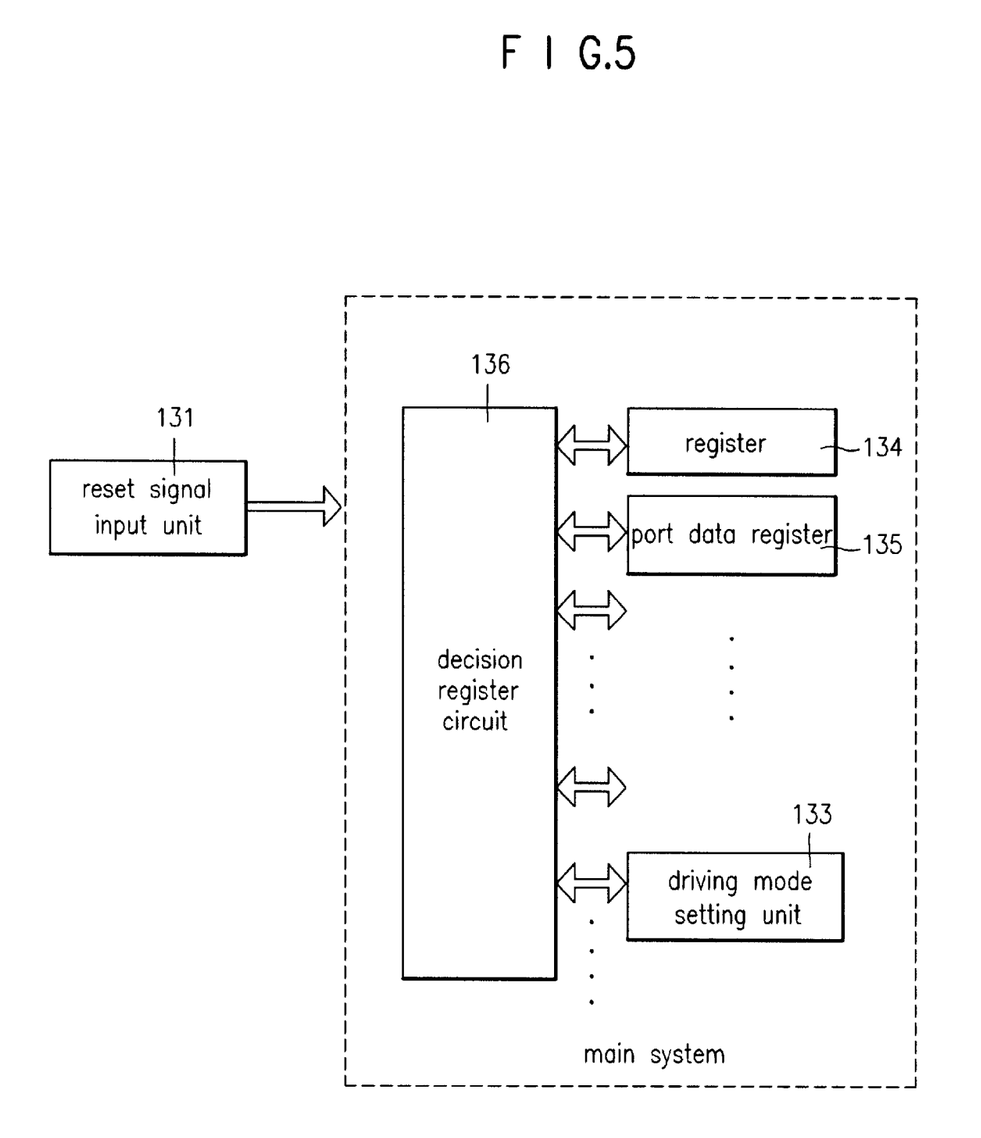
FIG. 5 is a block diagram of a reset device according to another embodiment of the present invention.

As shown in FIG. 5, the reset device according to the another embodiment includes a reset signal input unit 131 for inputting a reset signal according to the user's selection when the operation of the apparatus having the MCU is abnormal, a decision register circuit 136 (register block) for receiving the reset signal, and a plurality of component blocks. The decision register circuit 136 includes a register, e.g., for storing data therein. The reset signal can be generated by the reset signal input unit 131 or by an external source. The component blocks include a register 134, a port data register 135, and a driving mode setting unit 133.

When the reset is received, the decision register circuit 136 detects the set value of the present state of each component block in the main system and determines if the set value can be reused, e.g., by comparing the detected values of the present state of each component block with prestored data using a comparator known in the art. Based on this determination, the decision register circuit 136 selectively initializes only the component blocks which need to be initialized. The states of other component blocks are maintained.

The driving mode setting method according to the another embodiment of the present invention utilizes the reset device as shown in FIG. 5. This method is substantially the same as the method described referring to FIG. 4, except that the reset signal input by the reset signal input unit 131 passes through the decision register circuit 136 before it reaches the appropriate component blocks. The decision register circuit 136 stores data for determining whether or not the present state set value of each component block is reusable. Therefore, the decision register circuit 136 selectively transmits the reset signal to the component blocks based on this data.

A reset device and a driving mode setting Method according to still another embodiment of the present invention is described as follows.

Figure 6:
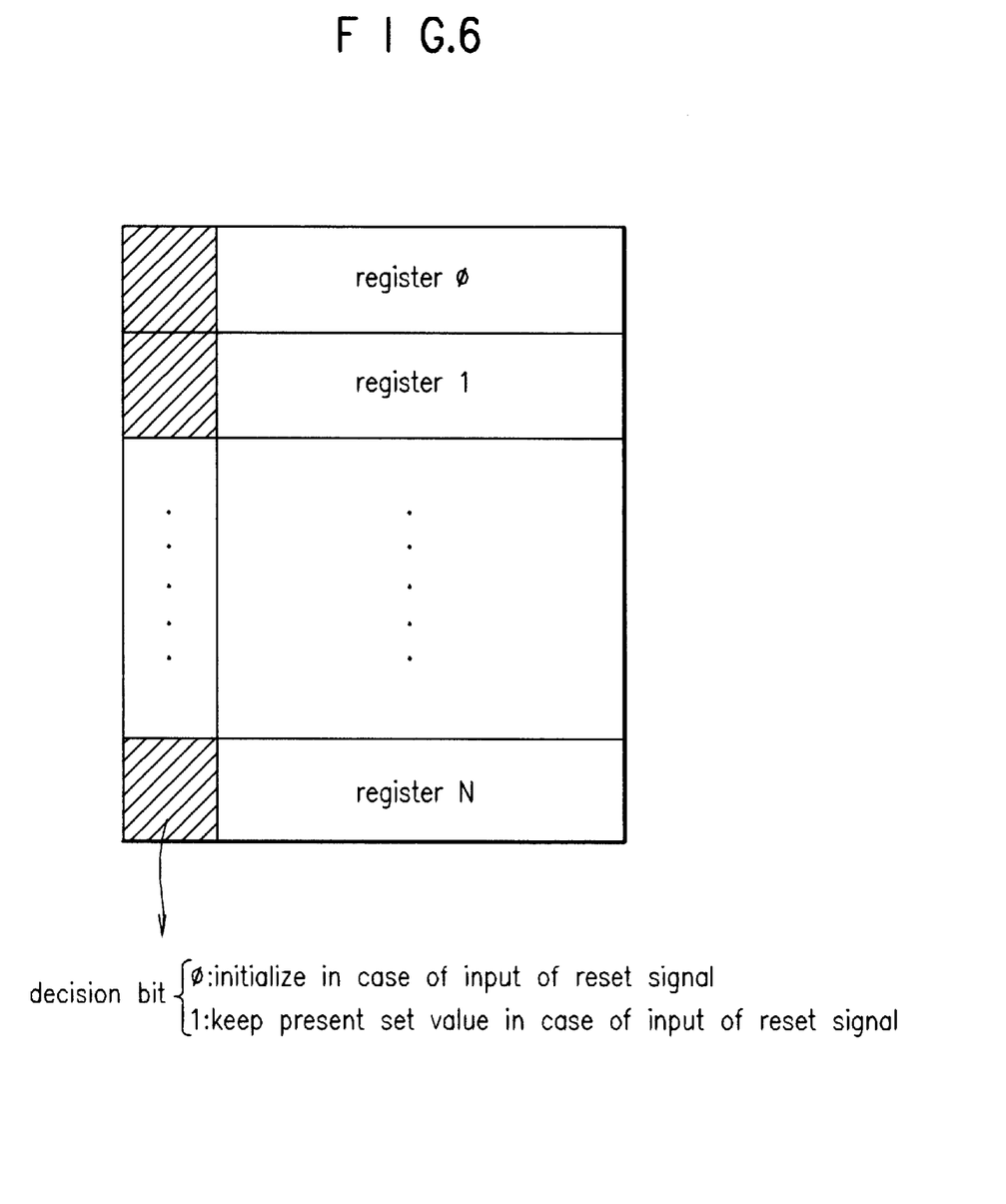
FIG. 6 is a constructive illustration of a portion of a reset device according to still another embodiment of the present invention.

FIG. 6 shows a plurality of registers each corresponding to a component block of the main system. Each register stores information relevant to authorize initialization of the corresponding component block.

As shown in FIG. 6, a register of each component block of the main system is provided with a decision bit. The decision bit may be stored in an unused space of the register or in a newly added memory. The decision bit indicates whether the corresponding block component is to be initialized or to be maintained in its present state. For example, the "0" decision bit may allow initialization of the component block, whereas the "1" decision bit may cause the component block to be maintained in its present state.

When the reset signal by a reset signal input unit is directly input to each of the component blocks of the main system, each component block is reset or maintained in its present set value, depending on the value of the decision bit (0 or 1) stored in the corresponding register.

The driving mode setting method using the above reset device operates in the same manner as the method described referring to FIG. 4, except that each component block stores the information necessary to decide whether the component block is to be initialized. Therefore, reading of the component block's present state set value for determining whether the component block is to be initialized, is substituted by reading the decision bit stored in the register of the component block. Based on the value of the decision bit, the component block is initialized or maintained in its present state.

In the reset device and the driving mode setting method according to the embodiments of the present invention, not all of the component blocks are initialized even if the reset signal is input. Some set values of the component blocks are selectively kept so that the component blocks which do not require initialization can perform their previous operations without interruptions. Consequently, there is no need to have an initial program for specifying the states of the component blocks. As a result, a smaller memory size can be used.

Furthermore, unnecessary initialization of component blocks are avoided, thereby substantially saving operation time and cost. Moreover, the present invention facilitates error detection, thereby facilitating programming and increasing system efficiency.

It will be apparent to those skilled in the art that various modifications and variations can be made in the reset device and the driving mode setting method of the present invention without departing from the spirit or scope of the invention. Thus, it is intended that the present invention cover the modifications and variations of this invention provided they come within the scope of the appended claims and their equivalents.

What is claimed is:

1. A reset device for selectively resetting component blocks of a system having a microprocessor control unit, the device comprising:

a reset signal unit for generating a reset signal; and a driving unit for receiving the reset signal from the reset signal unit, determining whether each of the component blocks is to be initialized or maintained in its present state when the reset signal is received, and selectively initializing the component blocks of the system based on this determination.

2. The device according to claim 1, wherein the component blocks include a register and a port data register.

3. The device according to claim 1, wherein the driving unit includes:

a decision register circuit for receiving the reset signal from the reset signal unit, detecting values of the current state of each of the component blocks, determining whether the component blocks are to be initialized based on this detection, and selectively inputting the reset signal to the component blocks based on this determination.

4. The device according to claim 1, wherein the reset signal unit includes:

a reset signal input unit for inputting the reset signal to the driving means according to a user's selection.

5. The device according to claim 4, wherein the driving unit includes:

a mode setting signal input unit, coupled to the component blocks, for detecting values of the current state of each of the component blocks, determining whether or not each of the component blocks is to be initialized based on this detection, and outputting a mode setting signal to a driving mode setting unit of the driving unit based on this determination.

6. The device according to claim 5, wherein the driving unit further includes:

the driving mode setting unit, coupled to the mode setting signal input unit, for selectively inputting the reset signal to each of the component blocks according to the mode setting signal.

7. The device according to claim 1, wherein each of the component blocks stores information related to initialization of the component block.

8. The device according to claim 7, wherein the information is a decision bit.

9. The device according to claim 8, wherein when the decision bit is zero, the reset signal is input to the component block for the initialization of the component block.

10. The device according to claim 8, wherein when the decision bit is one, the reset signal is not input to the component block and the component block is maintained in its present state.

11. The device according to claim 8, wherein the decision bit is stored in a register corresponding to the component block.

12. A method of selectively resetting component blocks of a system having a microprocessor control unit, the method comprising the steps of:

generating a reset signal to a determining unit;

determining, in the determining unit, whether each of the component blocks is to be initialized or maintained in its present state, upon receiving the reset signal; and selectively initializing the component blocks of the system based on this determination.

13. The method according to claim 12, wherein the generating step includes the step of:

inputting the reset signal to the system according to a user's selection.

14. The method according to claim 12, wherein the determining step includes the steps of:

detecting present set values of the component blocks;

determining whether or not each of the component blocks is to be initialized based on this detection; and generating a mode setting signal based on this determination.

15. The method according to claim 14, wherein the initializing step includes the step of:

selectively inputting the reset signal to each of the component blocks according to the mode setting signal.

16. The method according to claim 12, wherein the determining step includes the step of:

storing in each of the component blocks information related to initialization of the component block.

17. The method according to claim 16, wherein the information is a decision bit.

18. The method according to claim 17, wherein when the decision bit is zero, the reset signal is input to the component block for the initialization of the component block.

19. The method according to claim 17, wherein when the decision bit is one, the reset signal is not input to the component block and the component block is maintained in its present state.

20. The method according to claim 17, wherein the decision bit is stored in a register of the component block.

* * * * *